United States Patent
Harrison et al.

(10) Patent No.: US 6,893,063 B2
(45) Date of Patent: May 17, 2005

(54) VEHICLE BUMPER ASSEMBLIES AND ASSOCIATED TOWING ASSEMBLIES

(75) Inventors: Tom Copeman Harrison, Suffolk (GB); Richard John Edwards, Staffordshire (GB)

(73) Assignee: Wagon Automotive (UK) Limited, Walsall (GB)

( * ) Notice: Subject to any disclaimer, the term of this patent is extended or adjusted under 35 U.S.C. 154(b) by 0 days.

(21) Appl. No.: 10/427,505

(22) Filed: May 1, 2003

(65) Prior Publication Data

US 2004/0041416 A1 Mar. 4, 2004

(30) Foreign Application Priority Data

May 11, 2002 (GB) .............................................. 0210801

(51) Int. Cl.[7] .......................... B60D 1/56; B60R 19/34
(52) U.S. Cl. ...................................... 293/117; 293/133
(58) Field of Search ................................ 293/117, 133; 411/2, 3, 5, 427; 188/371, 376

(56) References Cited

U.S. PATENT DOCUMENTS

| | | | | |
|---|---|---|---|---|
| 4,470,736 A | * | 9/1984 | Tasseron | 411/404 |
| 4,571,135 A | * | 2/1986 | Martin et al. | 411/85 |
| 4,895,484 A | * | 1/1990 | Wilcox | 411/85 |
| 5,015,132 A | * | 5/1991 | Turner et al. | 411/10 |
| 6,439,650 B2 | * | 8/2002 | Artner et al. | 296/187.03 |
| 2003/0075935 A1 | * | 4/2003 | Dohrmann | 293/133 |

FOREIGN PATENT DOCUMENTS

| | | | | |
|---|---|---|---|---|
| DE | 29823354 | | 5/1999 | |
| DE | 19902478 | | 7/2000 | |
| DE | 10110332 | | 9/2002 | |
| DE | 10110332 A1 | * | 9/2002 | ............ B60D/1/14 |
| EP | 0949092 A1 | * | 10/1999 | |
| FR | 2777223 A1 | * | 10/1999 | ............ B60D/1/04 |
| JP | 063498 | | 3/2001 | |
| JP | 053066 | | 2/2002 | |
| WO | 03051654 | | 6/2003 | |

OTHER PUBLICATIONS

Abstract of JP 2002–053066.
Abstract of JP 2001–063498.

* cited by examiner

Primary Examiner—Patricia L. Engle
(74) Attorney, Agent, or Firm—Baker Botts LLP (57) ABSTRACT

A tow nut for a vehicle bumper assembly having an engagement portion by which a tow eye may be connected thereto and an attachment portion by which the tow nut may be attached to the assembly, characterized in that the tow nut is provided, between the engagement and attachment portions, with a zone of weakness whereby relative movement between the engagement portion and the assembly is permitted, under an impact condition.

14 Claims, 7 Drawing Sheets

VEHICLE BUMPER ASSEMBLIES AND ASSOCIATED TOWING ASSEMBLIES

BACKGROUND OF THE INVENTION

This invention relates, in broad terms, to the field of vehicular (principally automotive) crash systems and relates, in particular, to vehicular bumper assemblies that are provided with a forwardly-disposed towing facility whereby a vehicle may be towed by another.

A number of important considerations must be borne in mind during the design and production of such bumper assemblies. First and foremost, the impact-absorbing function of the bumper must be carefully monitored, so as to ensure that as much impact energy as possible is absorbed by the bumper assembly, and thus not transmitted to the main vehicle structure, or to the occupants thereof.

To this end, bumper assemblies typically comprise a metallic (sometimes rolled) front beam which may be attached, towards a rear part thereof, to a crash box, which is typically designed to deform ("crumple") under an impact condition. Alternatives to crash box systems are also known, in which the front beam is attached directly to a vehicle chassis rail, with the rail sometimes being provided with a sacrificial element to perform the energy-absorbing function. In both cases, however, the front face of the metallic beam is usually provided, for cosmetic reasons, with a covering, or skin, although such components contribute little to the impact-absorbing characteristics of the overall bumper assembly.

It has also become common practice, particularly in the domestic and light commercial vehicle industries, to provide, in conjunction with a front bumper assembly, some means whereby the vehicle concerned can be towed by another vehicle, in the case of breakdown, accident damage, insufficient fuel and the like.

To provide this capability, a so-called "tow nut" is attached to or provided with the forwardly-disposed bumper beam, with the tow nut having an internal thread to receive an externally threaded "tow eye" or "tow hook" having a circular or hooked end, by which a rope or other such line may be used to connect the towed and towing vehicles together. The term "tow nut" should thus be interpreted broadly, by reference to the function that it performs: it need not, of course, be "nut" shaped.

However, problems have arisen with currently available towing assemblies, principally as the rigid nature of the tow nut and its securement to the forwardly-disposed bumper beam seriously hinders the ability of the beam to crumple under impact conditions. In addition, as it has become the norm to provide a single tow nut towards one end of the forward bumper beam (and thus to one side of the front of the vehicle), the strength and hence impact-absorbing characteristics of the beam vary considerably along its length. As will be understood, this means that a vehicle provided with such a bumper assembly will suffer different types and amounts of damage during a collision, depending on which part of the vehicle is struck.

It is an object of the present invention to provide an improved tow nut that overcomes or at least reduces these problems. Other objects of the invention are to provide improved towing and vehicle bumper assemblies.

SUMMARY OF THE INVENTION

In accordance with a first aspect of the present invention, there is provided a tow nut for a vehicle bumper assembly having an engagement portion by which a tow eye may be connected thereto and an attachment portion by which the tow nut may be attached to the assembly, characterized in that the tow nut is provided, between the engagement and attachment portions, with a zone of weakness whereby relative movement between the engagement portion and the assembly is permitted, under an impact condition.

The zone of weakness may be associated with a reduced thickness portion in the tow nut.

The tow nut preferably is provided with frangible portion at or near the zone of weakness.

The attachment portion may comprise part of a flange and the reduced thickness portion may be associated therewith.

Preferably, the reduced thickness portion is provided by any undercut in the flange.

The reduced thickness portion may extend about the principal axis of the engagement portion.

The reduced thickness portion may be generally part-cylindrical.

Preferably, the engagement portion is generally tubular, with the reduced thickness portion being radially spaced from a wall into the tube.

Conveniently, the reduced thickness portion is radially spaced from an outer wall of the tube.

Various depths of undercut maybe employed, and the depth of the undercut may thus be at least half the depth of the flange.

Preferably, the depth of the undercut is about 80% of the depth of the flange.

Conveniently, the reduced thickness portion is about 1 mm thick.

In accordance with a second aspect of the present invention, there is provided a towing assembly for use with a vehicle bumper assembly, the towing assembly comprising an engagement formation by which the assembly may be connected to a towing vehicle and an attachment formation by which the towing assembly is attached to the bumper assembly, the towing assembly being provided, between the engagement formation and the attachment formation, with a zone of weakness whereby relative movement between the engagement formation and the bumper assembly is permitted, under an impact condition.

The zone of weakness of the towing assembly may be substantially in accordance with the first aspect of the present invention.

In accordance with a third aspect of the present invention, there is provided a vehicle bumper assembly having a tow nut substantially in accordance with the first aspect of the present invention.

In accordance with a fourth aspect of the present invention, there is provided a vehicle bumper assembly having a towing assembly substantially in accordance with the second aspect of the present invention.

BRIEF DESCRIPTION OF THE DRAWINGS

The invention, in its various aspects, will now be described, in greater detail, but strictly by way of example only, by reference to the accompanying drawings, of which:

FIG. 3b is an axial view, from above, of the tow nut of FIG. 3a;

DETAILED DESCRIPTION OF THE PREFERRED EMBODIMENTS

Figure 1:
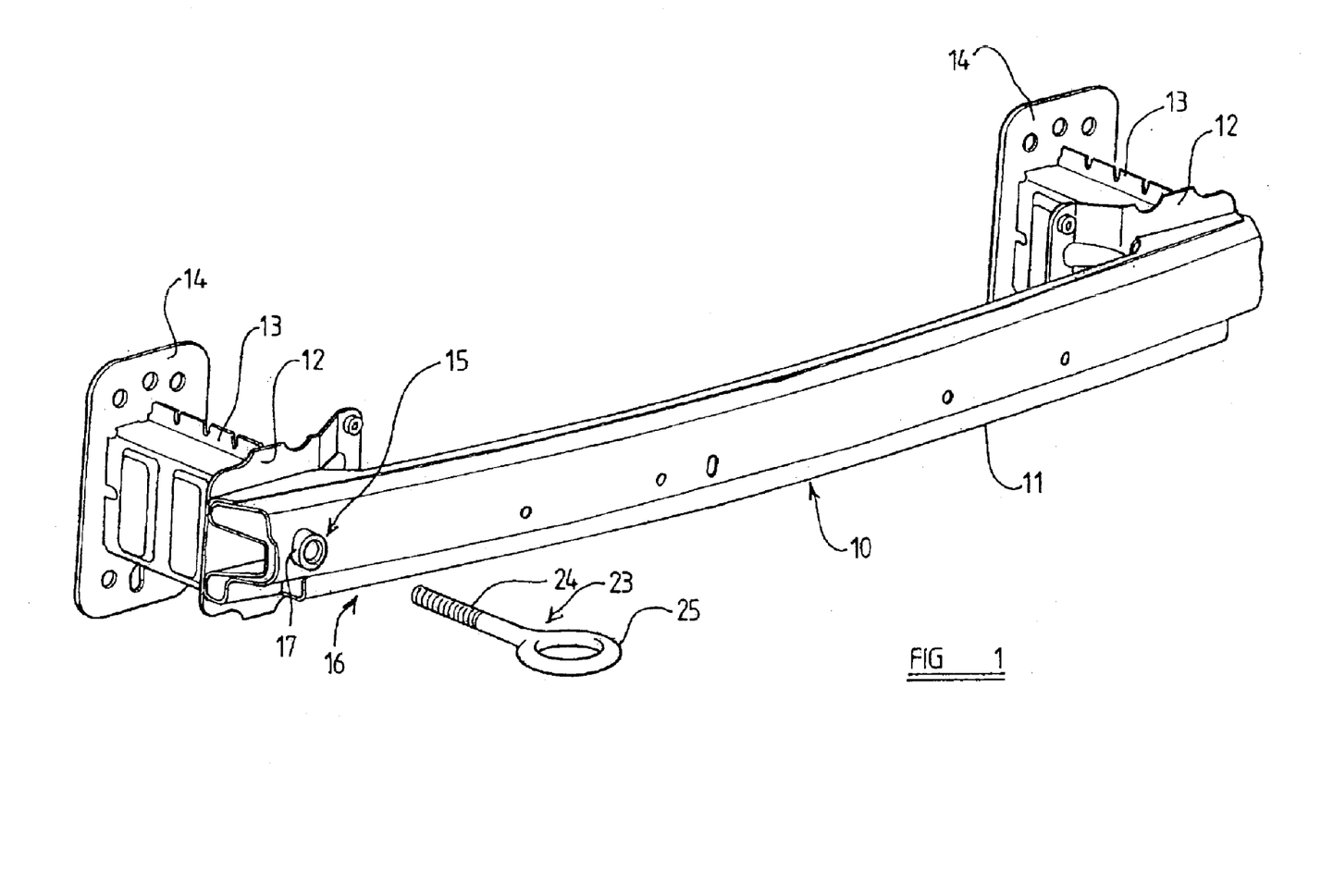
FIG. 1 is a perspective view of a vehicle bumper assembly in accordance with the present invention.
Figure 2:
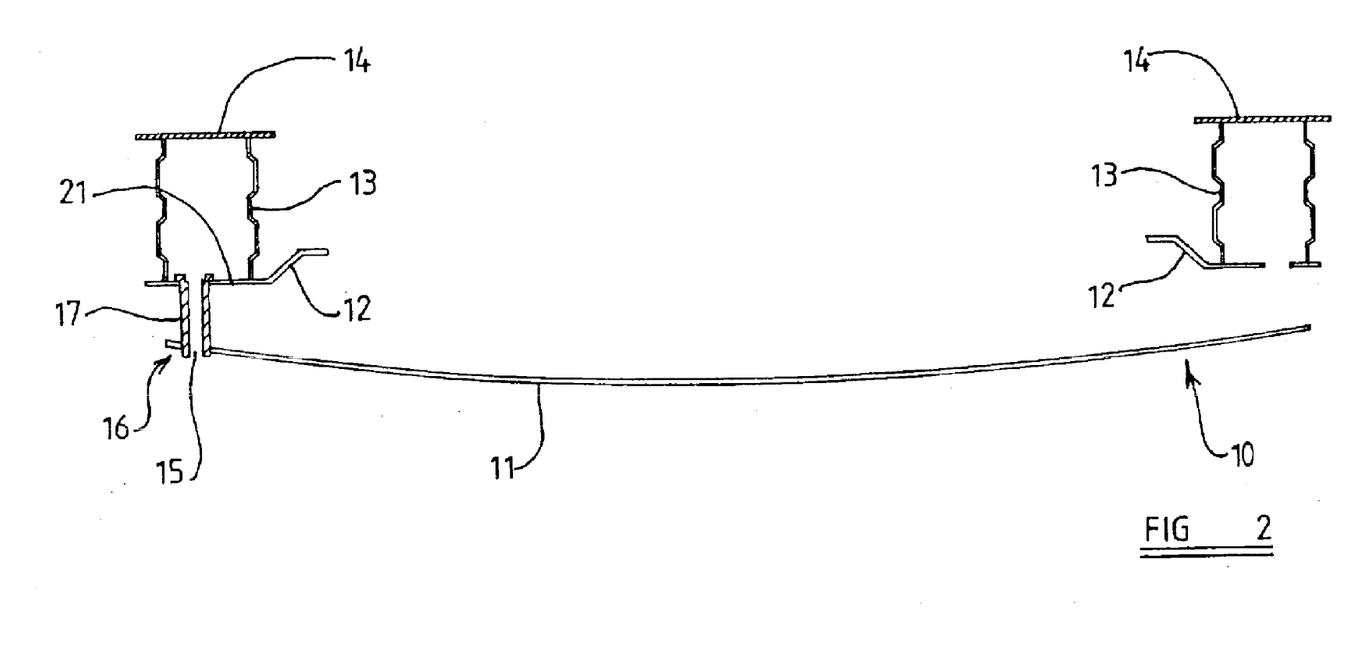
FIG. 2 is a schematic illustration, from above, of part of the assembly of FIG. 1.
Figure 3A:
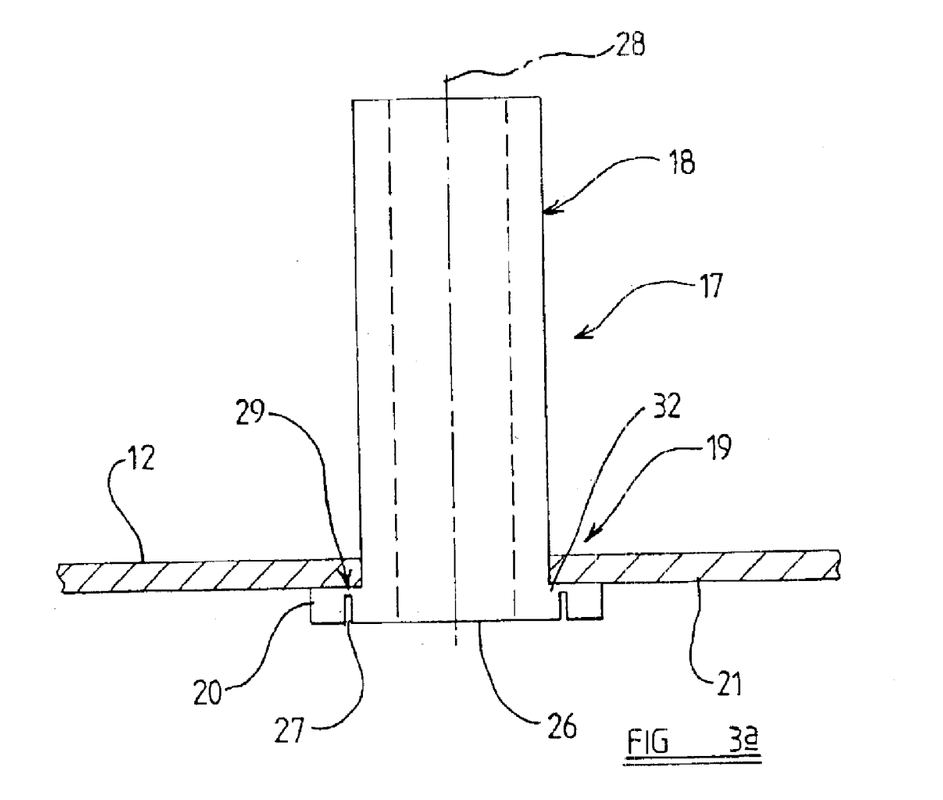
FIG. 3a is a close-up section of a tow nut in accordance with the present invention.
Figure 3B:
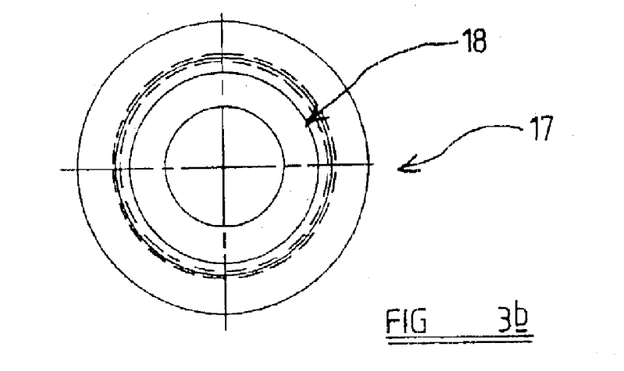

Referring to the Figures, a vehicle front bumper assembly 10 comprises a forwardly disposed bumper beam 11 which, in this example, is formed by rolling medium to high strength steel sheet, to form the elongate and partially hollow configuration shown. Although not illustrated in the drawings, it will of course be understood that, in practice, the beam 11 will usually be provided with a cosmetic and somewhat protective outer skin which may be formed from a rubber or plastics material, for example. The beam 11 is connected, via mounting plates 12, to crash boxes 13 which, whilst also formed from a metallic material, are specifically designed to collapse or "crumple", in the event that the vehicle experiences an impact. The crash boxes 13 are connected, towards their rear ends, to crash box back plates 14 which are fastened, in generally conventional manner, to a rigid part of the vehicle structure.

Figure 4:
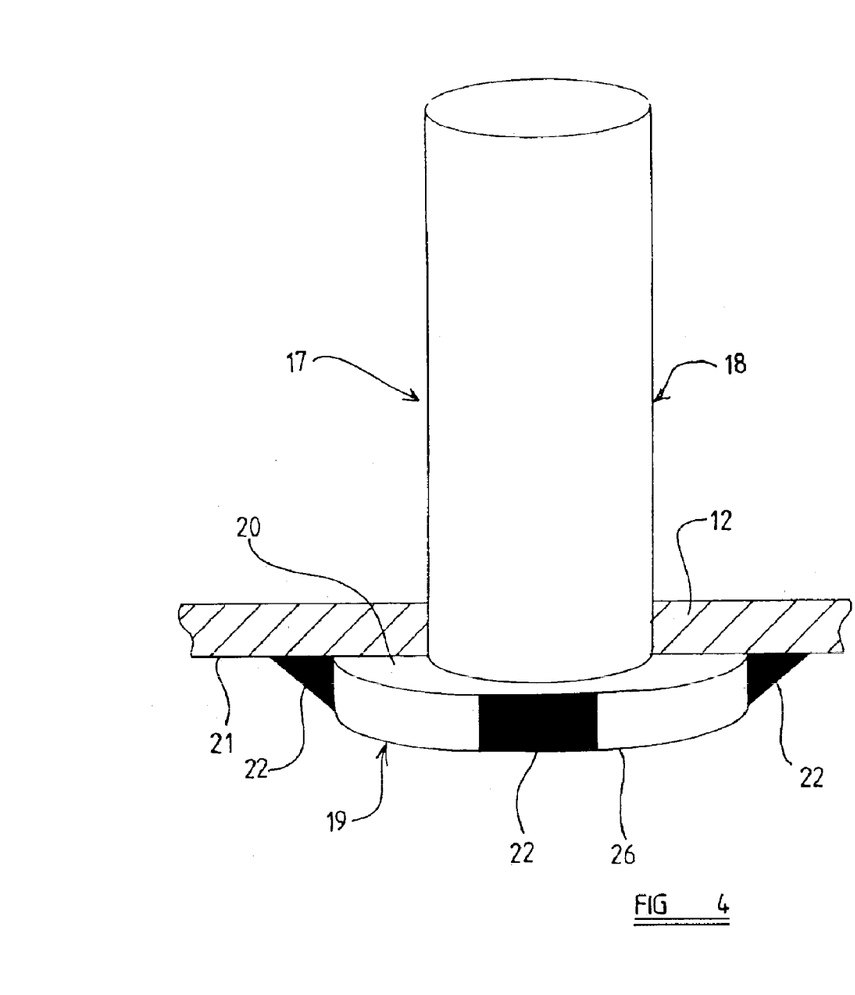
FIG. 4 is a perspective, schematic, illustration of the outer surfaces of the tow nut of FIGS. 3a and 3b, showing how the nut is welded to a bumper mounting plate.
Figure 5:
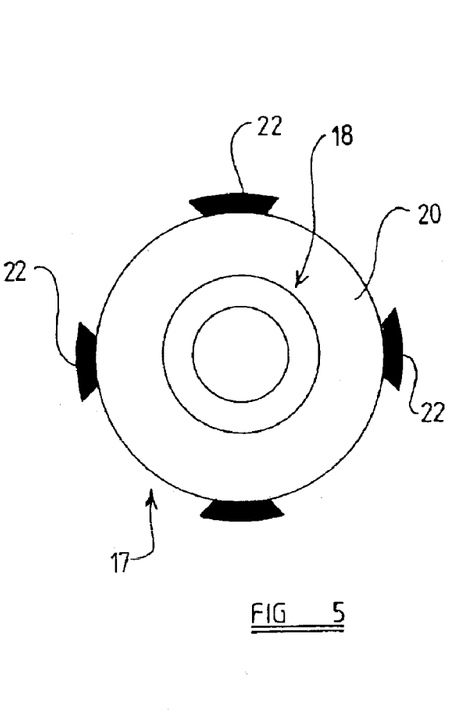
FIG. 5 is an axial view, from above, of the tow nut and welds of FIG. 4.

A generally circular aperture 15 is provided at one end 16 of the bumper beam 11, the aperture 15 serving to receive a tow nut 17 which, as shown in FIGS. 3a, 3b, 4, 5, 6a, 6b and 6c, has a generally tubular engagement portion 18 which is provided, on its internal surface, with a threaded configuration. The engagement portion 18 is attached to or integral with, at a rear end 19 thereof, a generally circular flange 20 which abuts a rearwardly-facing surface 21 of the mounting plate 12. The flange may, of course, be of a different configuration. The forwardly-disposed surface of the flange 20 constitutes an attachment portion by which the tow nut 17 may be attached to the mounting plate 12, and thus secured in relation to the rest of the bumper assembly 10. As shown in FIGS. 4 and 5, the tow nut 17 is preferably attached to the mounting plate 12 using four evenly circumferentially-spaced welds 22, although other attachment methods may, of course, also be used. An even, circumferential distribution of weld points is advantageous as this ensures that the tow nut 17 is able to withstand laterally-exerted forces such as may be experienced when the tow nut 17 is used, during transportation of a vehicle, to "tie down" the vehicle to restrict movement thereof during transit. It will however be appreciated that other weld configurations and arrangements could conceivably be employed, and it may be desirable, in cases where extra strength is required, to provide a single circumferentially-extending weld about the attachment portion, to the mounting plate 12. As shown in FIG. 1, the principal purpose of the tow nut 17 is to receive, on a temporary basis, a tow eye 23 which, in generally conventional manner, comprises an externally-threaded generally elongate shank 24 which, in use, is threadedly engageable with the internally-threaded female tow nut 17. The shank 24 is attached to or integral with an eye element 25 to which, in appropriate circumstances, a rope or other such towing line may be attached, to enable the vehicle to be towed.

Figure 6A:
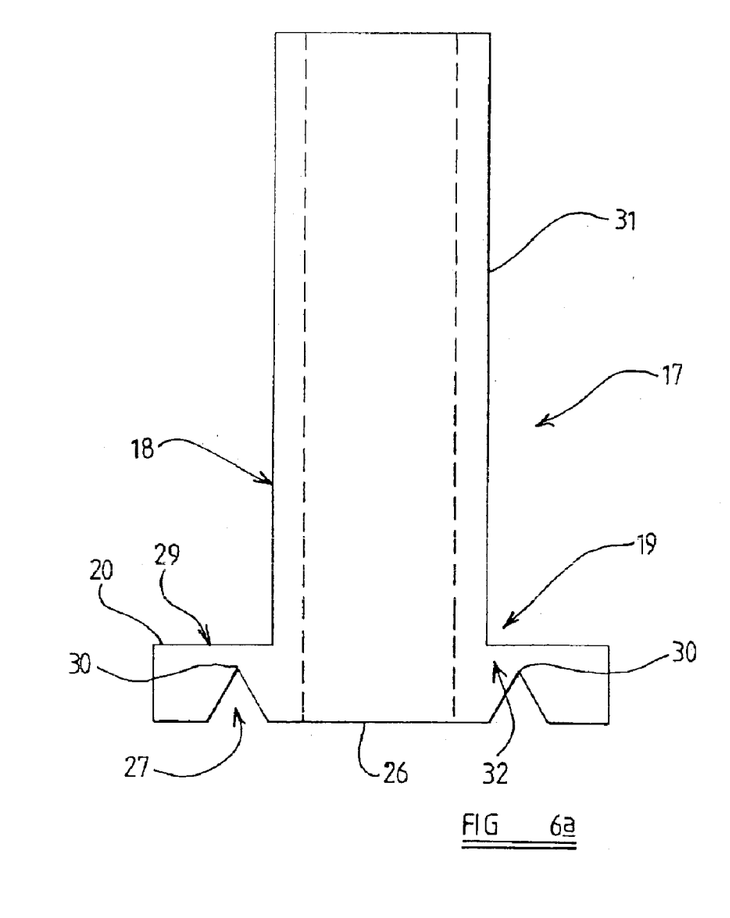
FIGS. 6a, 6b and 6c illustrate, in schematic form, a number of different configurations of recess that may be provided in the tow nut shown in the preceding figures in accordance with the present invention.
Figure 6B:
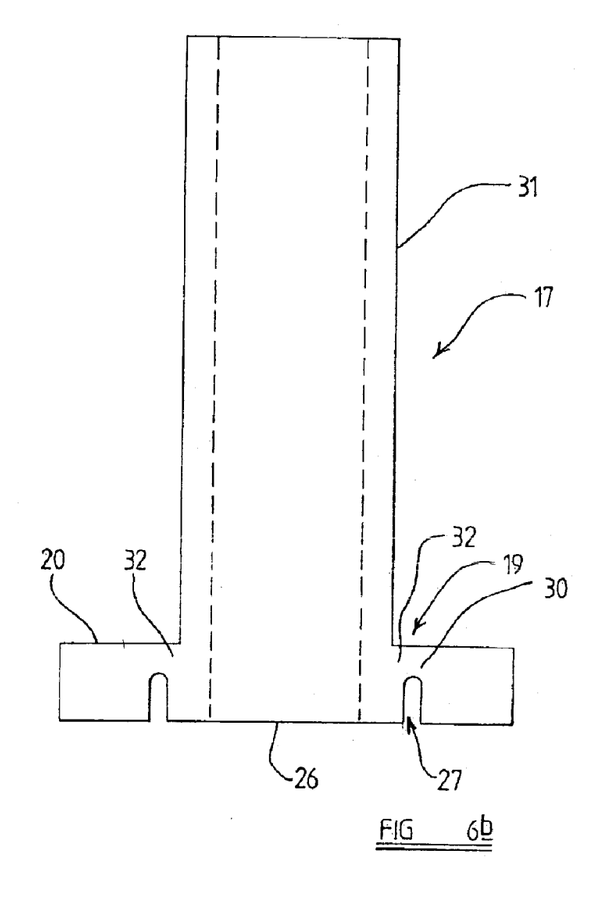
Figure 6C:
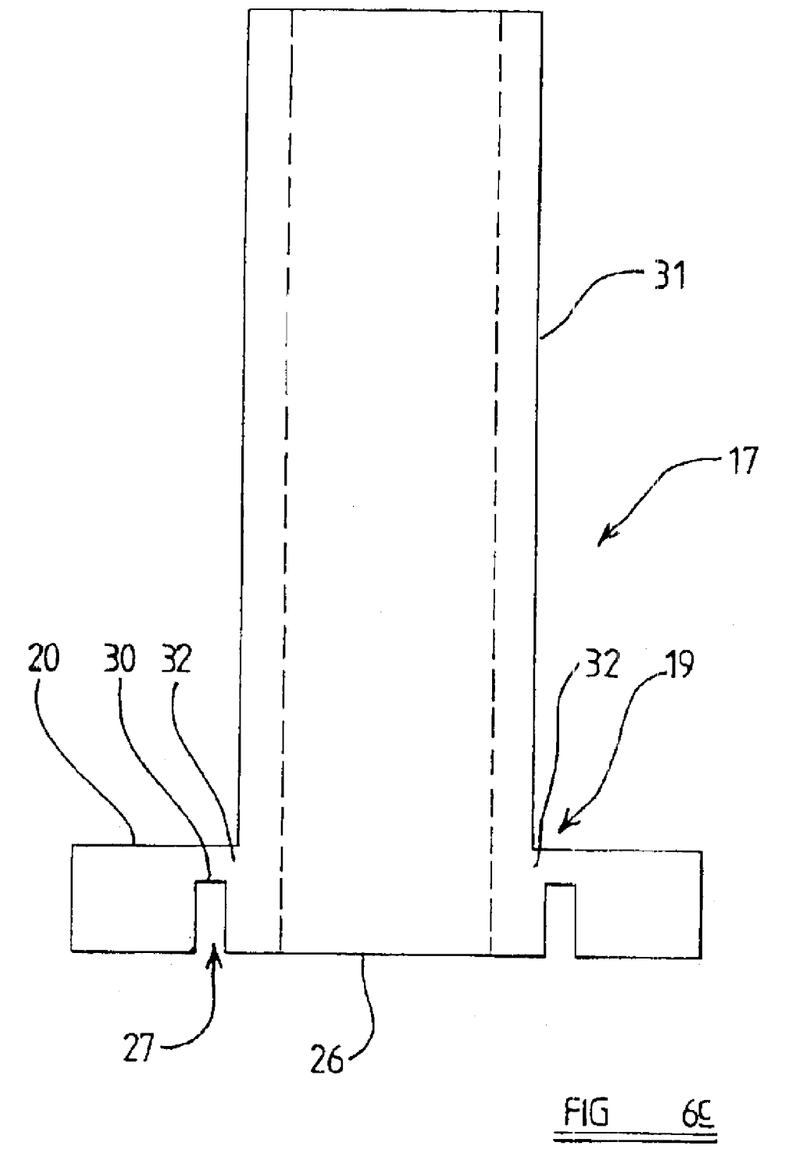

As shown in FIGS. 3a, 3b, 6a, 6b and 6c, the tow nut 17 is provided, on its underside 26, with a recessed channel 27 which extends, when the tow nut 17 is viewed axially, in a generally circular manner about the principal axis 28 of the tow nut 17. The channel 27, which constitutes a continuous undercut in the flange 20, creates a similarly generally circular reduced thickness portion 29 that is disposed between the engagement and attachment portions of the tow nut 17. As shown in FIGS. 6a, 6b and 6c, for example, the recess may have a number of differing cross-sections, although, in each case, it will be noted that the apex 30 of the cross-section is offset from the outer wall 31 of the engagement portion 18. This is to ensure the provision of a shoulder part 32 of generally full-thickness material which, in use, will abut the rearwardly-disposed surface 21 of the mounting plate 12. The provision of such full-thickness material is important during a towing operation, to ensure that the tow nut 17, on being pulled axially away from the mounting plate 12, is held securely in position. Nonetheless, by selecting an appropriate material, the applicants envisage that it may also be possible to locate the channel directly beneath, or close to, the outer wall 31.

As explained above, an important consideration in automotive bumper design is the extent to which the bumper assembly is able to absorb impact forces which are exerted when the vehicle is in collision with another vehicle, or static object, for example. Such energy absorption is important to minimize damage to the main vehicle structure, but principally to reduce the effect of the impact force on the occupants of the vehicle.

To this end, it is desirable to design vehicle bumper assemblies so that as much crash energy is absorbed by the front end of the vehicle, as possible, with the brunt being taken by the bumper beam 11 and crash box 13 of the assembly 10. In order for the bumper beam 11 to be able to collapse in the event of an impact, it is important that the components thereof are able to move in a generally rearwardly direction and that the "crumpling" capability of the crash box is not restricted. The provision of the undercut recess 27 in the flange 20 provides this, capability, in that, in the event of a generally axially-directed impact, the tow nut 17 will fail, in shear, at a zone of weakness defined by the reduced thickness portion 29, disposed just above the apex of the recess 27. As will be understood, this allows the generally tubular engagement portion to move, generally axially, in relation to the mounting plate 12, and hence to the rest of the bumper assembly 10, which in turn allows the bumper beam 11 to collapse, in a somewhat similar direction, towards the crash box 13. The positioning and configuration of the recess 27 may be adjusted to "tune" the tow nut 17 to fail, in shear, at a variety of different axial forces, with it typically being desired for a shear fail to occur when an axial force of 30 to 40 kN (kilo Newtons) is applied. In practice, the failure force will lie somewhere between, the force at which deformation of the bumper beam 11 commences and the force required to initiate collapse of the rearwardly disposed crash box 13. What this means is that, in the event of a minor impact, that does not cause the bumper beam 11 to deform, the tow nut 17 will remain intact and firmly secured to the mounting plate 12. However, where a greater impact is experienced, the tow nut 17 may fail, in shear, with the tubular body of the engagement portion 18 thus being propelled generally rearwardly of the assembly, into the body of the crash box 13. As the tubular body 18 has now become detached from the mounting plate 12, it can simply fall towards the rear of the crash box 13, thus ensuring that the crash box is able to crumple largely unhindered.

To ensure that the tow nut 17 does not accidentally become detached, in its entirety, from the mounting plate 12, it will be understood that the weld strength will normally need to exceed the strength of the zone of weakness defined by the undercut recess 27. This can of course be achieved in a number of ways, although the applicants have found that the total contact area between the welds 22 and the surface 21 of the plate 12 should exceed the upper surface area of the generally disc-shaped zone of weakness.

As will be understood from the foregoing, the invention, in its various aspects, provides a number of improvements in the field of automotive bumper design, principally as the facility of the tow nut to fail at a specified point, and under a known axial force, enables the forwardly-disposed bumper beam to collapse in the event of an impact, which, in turn, allows the energy absorbing aspect of the assembly to function in an unhindered manner. The offset nature of the undercut recess, however, ensures that the tow nut is sufficiently resilient, when exposed to a towing force, thus ensuring that it does not become separated inadvertently from the mounting plate 12 when a towing operation is underway, or when the associated vehicle is tied down, during transit.

Figure 7A:
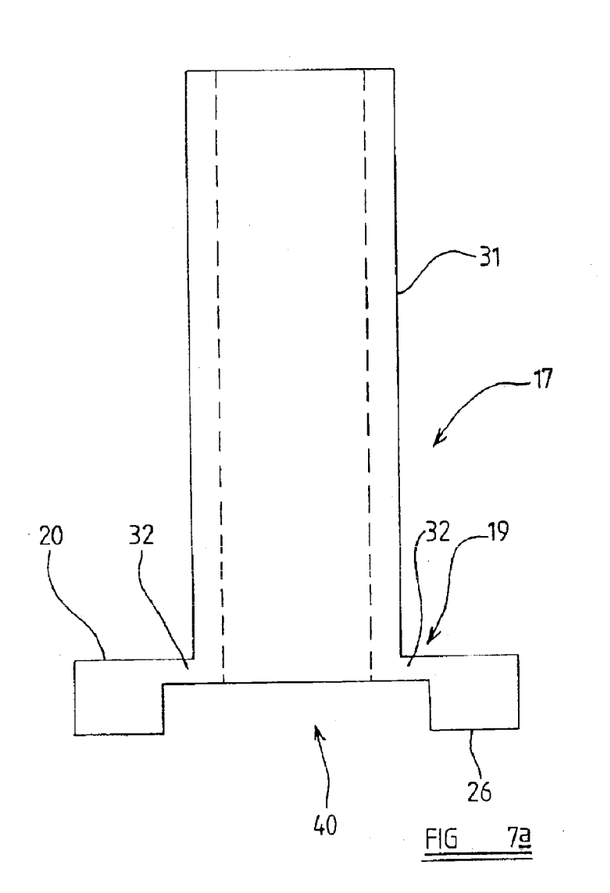
FIGS. 7a and 7b illustrate still further possible configurations of recess in accordance with the present invention.
Figure 7B:
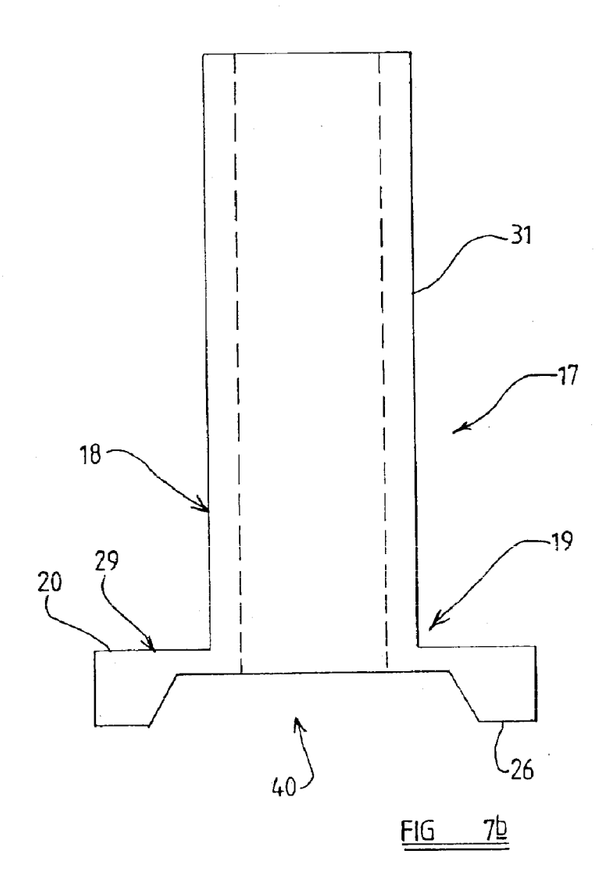

As shown in FIGS. 7a and 7b, the undercut recess in the flange 20 of the tow nut 17 may alternatively comprise a somewhat disc-shaped cut-out 40. As shown in the drawings, the provision of a reduced thickness (and hence reduced strength) zone is unaffected by the alternative recess configuration, with it conceivably being desirable to produce the tow nut in this way in an effort to reduce material usage and hence manufacturing costs.

It should also be understood that, whilst in the examples, the tow nut 17 is shown attached to the mounting plate 12 by abutment of the flange 20 with a rearwardly-facing surface 21 of the plate, it is envisaged by the applicants that the flange 20 could in fact be attached to the plate 12 by abutment with its opposite (forwardly-facing) surface. Thus, by reference to FIG. 3a, for example, it should be understood that, in use, the mounting plate 12 may in fact be disposed in abutment with the underside 26 of the tow nut 17.

The features disclosed in the foregoing description, or the following claims, or the accompanying drawings, expressed in their specific forms or in terms of a means for performing the disclosed function, or a method or process for attaining the disclosed result, as, appropriate, may, separately, or in any combination of such, features, be utilized for realizing the invention in diverse forms thereof.

We claim:

1. A tow nut for a vehicle bumper assembly comprising a bumper beam and a crash box disposed rearwardly of the beam, the tow nut having an engagement portion by which a tow eye may be connected thereto and an attachment portion by which the tow nut may be attached to the bumper assembly, wherein the tow nut is provided, between the engagement and attachment portions, with a zone of weakness whereby relative movement between the engagement portion and the crash box is permitted, under an impact condition.

2. A tow nut according to claim 1 wherein the zone of weakness is associated with a reduced thickness portion of the tow nut.

3. A tow nut according to claim 1 having a frangible portion at or near the zone of weakness.

4. A tow nut according to claim 2 wherein the attachment portion comprises part of a flange and wherein the reduced thickness portion is associated therewith.

5. A tow nut according to claim 4 wherein the reduced thickness portion is provided by an undercut in the flange.

6. A tow nut according to claim 2 wherein the reduced thickness portion extends about a principal axis of the engagement portion.

7. A tow gut according to claim 2 wherein the reduced thickness portion is generally part-cylindrical.

8. A tow nut according to claim 2 wherein the engagement portion is generally tubular and wherein the reduced thickness portion is radially spaced from the engagement portion.

9. A tow nut according to claim 8 wherein the reduced thickness portion is radially spaced from an outer wall of the engagement portion.

10. A tow nut according to claim 5 wherein the undercut has a depth of at least half of the flange depth.

11. A tow nut according to claim 10 wherein the undercut depth is about 80% of the flange depth.

12. A tow nut according to claim 2 wherein the reduced thickness portion is about 1 mm thick.

13. A towing assembly for use with a vehicle bumper assembly comprising a bumper beam and a crash box disposed rearwardly of the beam, the towing assembly comprising an engagement formation by which the bumper assembly may be connected to a towing vehicle and an attachment formation by which the towing assembly is attached to the bumper assembly, the towing assembly being provided, between the engagement formation and the attachment formation, with a zone of weakness whereby relative movement between the engagement formation and the crash box is permitted, under an impact condition.

14. A towing assembly according to claim 13 wherein the relative movement between the engagement formation and the crash box is permitted under a generally axially-directed impact condition.

* * * * *